(12) United States Patent
Rangarajan et al.

(10) Patent No.: US 11,334,881 B2
(45) Date of Patent: May 17, 2022

(54) SECURITY TOOL

(71) Applicant: Bank of America Corporation, Charlotte, NC (US)

(72) Inventors: Prabakar Rangarajan, Chennai (IN); Tarannum Salahuddin Ansari, Mumbai (IN); Prabhu Sannasi Maharajan, Chennai (IN); Ramesh Alagar, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 451 days.

(21) Appl. No.: 16/259,120

(22) Filed: Jan. 28, 2019

(65) Prior Publication Data
US 2020/0242598 A1 Jul. 30, 2020

(51) Int. Cl.
| | |
|---|---|
| *G06Q 20/38* | (2012.01) |
| *G06Q 20/40* | (2012.01) |
| *H04L 9/32* | (2006.01) |
| *H04L 9/08* | (2006.01) |
| *H04L 67/564* | (2022.01) |

(Continued)

(52) U.S. Cl.
CPC ....... *G06Q 20/3825* (2013.01); *G06F 40/186* (2020.01); *G06F 40/205* (2020.01); *G06Q 20/4016* (2013.01); *H04L 9/0891* (2013.01); *H04L 9/0894* (2013.01); *H04L 9/321* (2013.01); *H04L 9/3247* (2013.01); *H04L 9/3263* (2013.01); *H04L 67/2819* (2013.01)

(58) Field of Classification Search
CPC ............ G06Q 20/3825; G06Q 20/4016; H04L 9/3263; H04L 9/321; H04L 9/0894; H04L 9/0891; H04L 67/2819; H04L 9/3247; H04L 9/3268; H04L 63/0823
See application file for complete search history.

(56) References Cited

U.S. PATENT DOCUMENTS

| | | | | |
|---|---|---|---|---|
| 6,658,568 | B1 * | 12/2003 | Ginter | H04N 7/162 380/231 |
| 6,842,863 | B1 * | 1/2005 | Fox | H04L 9/3263 713/157 |

(Continued)

OTHER PUBLICATIONS

C. Ekechukwu, D. Lindskog and R. Ruhl, "A Notary Extension for the Online Certificate Status Protocol," 2013 International Conference on Social Computing, 2013, pp. 1016-1021, doi: 10.1109/SocialCom.2013.163.*

*Primary Examiner* — Steven S Kim

(57) ABSTRACT

An apparatus includes a memory and a hardware processor. The memory stores a private encryption key. The processor intercepts a first transaction request from a user, communicates a first recertification request to a certificate authority that issued the private encryption key, and receives, from the certificate authority, a first message indicating that the private encryption key is valid for use. In response to the first message, the processor generates a first digital signature using the private encryption key, generates a first non-repudiation message comprising the first digital signature and the first message, generates a second message comprising the first transaction request and the first non-repudiation message, and communicates the second message to a server to process the first transaction request.

17 Claims, 5 Drawing Sheets

(51) Int. Cl.
*G06F 40/186* (2020.01)
*G06F 40/205* (2020.01)

(56) References Cited

U.S. PATENT DOCUMENTS

| | | | |
|---|---|---|---|
| 7,254,561 B1* | 8/2007 | Sjoblom | G06Q 90/00 705/65 |
| 7,720,763 B2* | 5/2010 | Campbell | G06Q 20/10 705/44 |
| 7,751,558 B2* | 7/2010 | Gentry | H04L 9/30 380/30 |
| 7,904,725 B2 | 3/2011 | Pavlicic | |
| 7,958,349 B2 | 6/2011 | Parkinson | |
| 8,635,442 B2 | 6/2014 | Agrawal | |
| 9,118,486 B2 | 8/2015 | Pritikin | |
| 9,231,925 B1* | 1/2016 | Lundstrom | H04L 29/06 |
| 9,325,509 B2 | 4/2016 | Sato et al. | |
| 9,461,828 B2 | 10/2016 | Engberg et al. | |
| 9,727,862 B2* | 8/2017 | O'Connell | G06Q 20/4014 |
| 9,785,936 B1* | 10/2017 | Baird | G06Q 20/3276 |
| 9,906,373 B2 | 2/2018 | Pritikin | |
| 10,304,051 B2* | 5/2019 | Laracey | G06Q 30/06 |
| 10,664,697 B1* | 5/2020 | Patel | G06Q 20/027 |
| 11,222,314 B2* | 1/2022 | Leber | G06Q 20/385 |
| 2001/0032310 A1* | 10/2001 | Corella | H04L 9/00 713/156 |
| 2003/0005305 A1* | 1/2003 | Brickell | H04L 9/00 713/177 |
| 2003/0023494 A1* | 1/2003 | Sellman | G06F 17/60 705/17 |
| 2004/0039672 A1* | 2/2004 | Zivic | G06Q 40/06 705/36 R |
| 2010/0274722 A1* | 10/2010 | Roberts | G06Q 20/40 705/44 |
| 2013/0297509 A1* | 11/2013 | Sebastian | G06Q 20/20 705/44 |
| 2014/0331287 A1* | 11/2014 | Barr | H04L 29/06 |
| 2015/0134540 A1* | 5/2015 | Law | G06Q 20/02 705/72 |

\* cited by examiner

SECURITY TOOL

TECHNICAL FIELD

This disclosure relates generally to security and fraud.

BACKGROUND

Computers and mobile devices are increasingly used to perform transactions.

SUMMARY OF THE DISCLOSURE

Computers and mobile devices are increasingly used to perform transactions. Typically, to safeguard the transaction against fraud, a user who requested the transaction can attach a digital signature to the transaction. This digital signature can be generated using a private encryption key that only the user can access. The transaction and the digital signature are then sent to a server that can validate the digital signature using a public encryption key of the user. After the digital signature is validated, the server processes the transaction.

The private and public encryption keys are issued by a certificate authority. For example, the certificate authority generates and sends the private and public encryption keys to the user. The user can then share the public encryption key with as many servers and services as user desires. The certificate authority tracks the status of the private and public encryption keys. For example, the certificate authority can let others know whether the private and public encryption keys are valid for use. If the user notifies the certificate authority that the private and public encryption keys are no longer valid (e.g., because they have been compromised), then the certificate authority can invalidate the private and public encryption keys and issue new private and public encryption keys to the user.

The process of invalidating and issuing new private and public encryption keys, however, has several drawbacks. First, the process may result in delays that cause a desynchronization to occur. For example, because the certificate authority does not publish or push updates to the private and public encryption keys' status, it is up to users and servers to query the certificate authority when the status of these keys is in question. As a result, servers will not know that a public encryption key is invalid unless the servers query the certificate authority or unless a user sends an updated public encryption key to the servers. Until one of these events happens, the servers are desynchronized from the certificate authority. During this desynchronization period, any server that uses the user's, now-invalid, public encryption key to validate the, now invalid, private encryption key would still determine that the validation was successful, even though these keys are invalid. As a result, a hacker who compromised or stole the private encryption key or even the user himself could use this desynchronization period to perform unauthorized transactions. Then, after the desynchronization period, the user can repudiate the transaction and/or seek a refund.

One solution to protect against fraud and the desynchronization period would be for servers to query the certificate authority about the status of a public encryption key when the user sends a transaction request, but this solution would be practically infeasible for the servers. Servers typically process a large amount (e.g., millions) of transactions daily from a plethora of users. If the servers queried the certificate authority for each transaction in addition to processing the transaction, the servers would become overloaded. Additionally, this solution may violate the privacy of the user because the certificate authority would be able to deduce that the user is performing a transaction each time the servers queried the certificate authority.

This disclosure contemplates a security tool (e.g., a mobile device of a user) that improves security by protecting against fraud and the desynchronization period. The security tool intercepts user transaction requests and re-certifies the private encryption key of the user with the certificate authority before sending the transaction requests to servers. The security tool generates and sends messages to the servers that indicate the transaction and the validity of the private encryption key. In this manner, the servers are assured, for each transaction, that the private and public encryption keys are valid before performing the transaction. Additionally, the servers are not burdened with the task of validating the private and public encryption keys. Moreover, the privacy of the user is not violated because, from the certificate authority's perspective, the user is merely requesting a re-certification of his own private encryption key. Certain embodiments of the security tool are described below.

According to an embodiment, an apparatus includes a memory and a hardware processor. The memory stores a private encryption key. The processor intercepts a first transaction request from a user, communicates a first recertification request to a certificate authority that issued the private encryption key, and receives, from the certificate authority, a first message indicating that the private encryption key is valid for use. In response to the first message, the processor generates a first digital signature using the private encryption key, generates a first non-repudiation message comprising the first digital signature and the first message, generates a second message comprising the first transaction request and the first non-repudiation message, and communicates the second message to a server to process the first transaction request.

According to another embodiment, a method includes storing, by a memory, a private encryption key and intercepting, by a hardware processor communicatively coupled to the memory, a first transaction request from a user. The method further includes communicating, by the processor, a first recertification request to a certificate authority that issued the private encryption key and receiving, by the processor, from the certificate authority, a first message indicating that the private encryption key is valid for use. In response to the first message, the method includes generating, by the processor, a first digital signature using the private encryption key, generating, by the processor, a first non-repudiation message comprising the first digital signature and the first message, generating, by the processor, a second message comprising the first transaction request and the first non-repudiation message, and communicating, by the processor, the second message to a server to process the first transaction request.

According to yet another embodiment, a system includes a certificate authority, a server, and a security tool. The security tool stores a private encryption key from the certificate authority and intercepts a first transaction request from a user. The security tool communicates a first recertification request to the certificate authority and receives, from the certificate authority, a first message indicating that the private encryption key is valid for use. In response to the first message, the security tool generates a first digital signature using the private encryption key, generates a first non-repudiation message comprising the first digital signature and the first message, generates a second message comprising the first transaction request and the first non-repudiation message, and communicates the second message to the server to process the first transaction request.

Certain embodiments provide one or more technical advantages. For example, an embodiment improves security and reduces fraud by using a user's mobile device to re-certify a private encryption key before communicating a transaction request to a server. As another example, an embodiment improves user privacy by using a user's mobile device to re-certify keys instead of using servers to re-certify keys. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
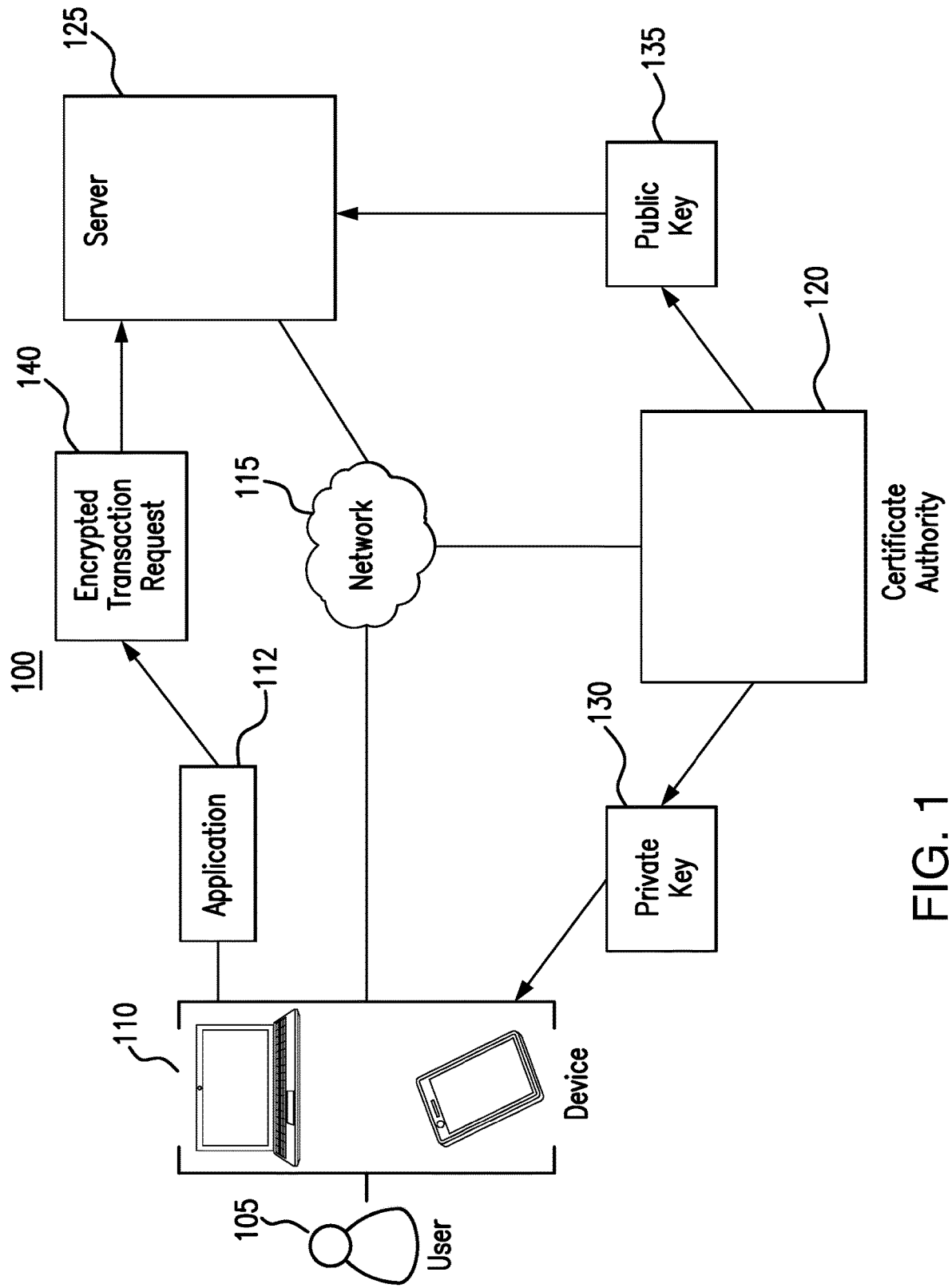
FIG. 1 illustrates an example system.

Embodiments of the present disclosure and its advantages are best understood by referring to FIGS. 1 through 5 of the drawings, like numerals being used for like and corresponding parts of the various drawings.

Computers and mobile devices are increasingly used to perform transactions. Typically, to safeguard the transaction against fraud, a user who requested the transaction can attach a digital signature to the transaction. This digital signature can be generated using a private encryption key that only the user can access. The transaction and the digital signature are then sent to a server that can validate the digital signature using a public encryption key of the user. After the digital signature is validated, the server processes the transaction.

The private and public encryption keys are issued by a certificate authority. For example, the certificate authority generates and sends the private and public encryption keys to the user. The user can then share the public encryption key with as many servers and services as user desires. The certificate authority tracks the status of the private and public encryption keys. For example, the certificate authority can let others know whether the private and public encryption keys are valid for use. If the user notifies the certificate authority that the private and public encryption keys are no longer valid (e.g., because they have been compromised), then the certificate authority can invalidate the private and public encryption keys and issue new private and public encryption keys to the user.

The process of invalidating and issuing new private and public encryption keys, however, has several drawbacks. First, the process may result in delays that cause a desynchronization to occur. For example, because the certificate authority does not publish or push updates to the private and public encryption keys' status, it is up to users and servers to query the certificate authority when the status of these keys is in question. As a result, servers will not know that a public encryption key is invalid unless the servers query the certificate authority or unless a user sends an updated public encryption key to the servers. Until one of these events happens, the servers are desynchronized from the certificate authority. During this desynchronization period, any server that uses the user's, now-invalid, public encryption key to validate the, now invalid, private encryption key would still determine that the validation was successful, even though these keys are invalid. As a result, a hacker who compromised or stole the private encryption key or even the user himself could use this desynchronization period to perform unauthorized transactions. Then, after the desynchronization period, the user can repudiate the transaction and/or seek a refund.

One solution to protect against fraud and the desynchronization period would be for servers to query the certificate authority about the status of a public encryption key when the user sends a transaction request, but this solution would be practically infeasible for the servers. Servers typically process a large amount (e.g., millions) of transactions daily from a plethora of users. If the servers queried the certificate authority for each transaction in addition to processing the transaction, the servers would become overloaded. Additionally, this solution may violate the privacy of the user because the certificate authority would be able to deduce that the user is performing a transaction each time the servers queried the certificate authority.

This disclosure contemplates a security tool (e.g., a mobile device of a user) that improves security by protecting against fraud and the desynchronization period. The security tool intercepts user transaction requests and re-certifies the private encryption key of the user with the certificate authority before sending the transaction requests to servers. The security tool generates and sends messages to the servers that indicate the transaction and the validity of the private encryption key. In this manner, the servers are assured, for each transaction, that the private and public encryption keys are valid before performing the transaction. Additionally, the servers are not burdened with the task of validating the private and public encryption keys. Moreover, the privacy of the user is not violated because, from the certificate authority's perspective, the user is merely requesting a re-certification of his own private encryption key. The system and the security tool will be described in more detail using FIGS. 1 through 5.

FIG. 1 illustrates an example system 100. As seen in FIG. 1, system 100 includes a user 105, one or more devices 110, a network 115, a certificate authority 120, and a server 125. Generally, user 105 uses a device 110 to encrypt transaction requests using a private encryption key issued by certificate authority 120. Server 125 decrypts the encrypted transaction request using a public encryption key issued by certificate authority 120. Server 125 then performs the requested transaction. In this manner, transactions requested by user 105 are protected from theft, and/or fraud.

User 105 may use one or more devices 110 to conduct transactions with server 125. Devices 110 may execute one or more applications 112 to conduct transactions with server 125. For example, application 112 may generate and encrypt transaction requests to produce encrypted transaction requests 140. Application 112 may then communicate encrypted transaction requests 140 to server 125 for decryption and processing. Application 112 may encrypt transaction requests using private encryption key 130 issued by certificate authority 120.

Devices 110 include any appropriate device for communicating with components of system 100 over network 115.

For example, devices 110 may be a telephone, a mobile phone, a computer, a laptop, a tablet, an automated assistant, and/or a cash register. This disclosure contemplates device 110 being any appropriate device for sending and receiving communications over network 115. As an example and not by way of limitation, device 110 may be a computer, a laptop, a wireless or cellular telephone, smartphone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Certificate authority 120 issues encryption keys to various components of system 100. For example, certificate authority 120 issues private encryption key 130 to one or more devices 110 and public encryption key 135 to server 125. In some embodiments, certificate authority 120 issues both private encryption key 130 and public encryption key 135 to one or more devices 110. Device 110 then communicates public encryption key 135 to server 125. Device 110 may communicate public encryption key 135 to as many servers 125 as user 105 desires. Each server 125 that receives public encryption key 135 may be able to decrypt encrypted transaction request 140.

Certificate authority 120 tracks the status of the encryption keys issued by certificate authority 120. For example, certificate authority 120 may track whether a private encryption key 130 and public encryption key 135 are valid. If user 105 determines that private encryption key 130 and/or public encryption key 135 have been compromised, such as for example by a hacker, user 105 may notify certificate authority 120 that private encryption key 130 and/or public encryption key 135 should be invalidated. In response, certificate authority 120 invalidates private encryption key 130 and public encryption key 135. Certificate authority 120 may also reissue new private encryption keys and/or public encryption keys to device 110.

Server 125 is any hardware (e.g., processor and/or memory) and/or software configured to decrypt and process transactions from device 110. This disclosure contemplates server 125 processing any suitable transaction and performing any suitable function. Server 125 receives encrypted transaction request 140. Server 125 decrypts encrypted transaction request 140 using public encryption key 135. After encrypted transaction request 140 is decrypted, server 125 processes the decrypted transaction request.

Generally, the encryption/decryption process in system 100 is as follows. Certificate authority 120 issues private encryption key 130 and public encryption key 135 to device 110. Device 110 then communicates public encryption key 135 to server 125. Device 110 generates a transaction request. Device 110 then encrypts the transaction request using private encryption key 130 to produce encrypted transaction request 140. Device 110 communicates encrypted transaction request 140 to server 125. Server 125 uses public encryption key 135 to decrypt encrypted transaction request 140. Server 125 then processes the decrypted transaction request. In this manner, the security of a transaction request is protected from theft and/or hacks, because only a server 125 that has public encryption key 135 may decrypt the encrypted transaction request 140.

This encryption/decryption process has certain draw backs. For example, when user 105 notifies certificate authority 120 that private encryption key 130 and/or public encryption key 135 have been compromised. Certificate authority 120 may invalidate private encryption key 130 and public encryption key 135. However, certificate authority 120 may not publish the invalidation or notify server 125 that private encryption key 130 and/or public encryption key 135 are no longer valid. Rather, certificate authority 120 waits for device 110 and/or server 125 to query certificate authority 120 before certificate authority 120 lets device 110 and/or server 125 know that private encryption key 130 and/or public encryption key 135 are no longer valid. This process results in a desynchronization between server 125 and certificate authority 120. Certificate authority 120 may know that private encryption key 130 and/or public encryption key 135 are invalid, but server 125 may believe that private encryption key 130 and/or public encryption key 135 are still valid. As a result, when this desynchronization occurs, a hacker and/or user 105 may communicate a transaction request that was encrypted using the now invalid private encryption key 130 to server 125. Server 125 may decrypt encrypted transaction request 140 using the now invalid public encryption key 135. Server 125 may then process the decrypted transaction request even though private encryption key 130 and public encryption key 135 are no longer valid. As a result, the desynchronization period results in a security loophole through which user 105 and/or hackers may communicate fraudulent transaction requests to server 125.

One way to address the desynchronization problem is to have server 125 query certificate authority 120 each time server 125 receives encrypted transaction request 140. This solution, however, is infeasible due to the number of requests processed by server 125. For example, in existing implementations, server 125 may process millions of transactions daily from thousands or millions of users 105. If server 125 was required to query certificate authority 120 for each transaction and then process the transaction, server 125 would become overloaded. Additionally, this solution may violate the privacy of the users because certificate authority 120 would be able to deduce that a user 105 is preforming a transaction each time server 125 queried certificate authority 120.

This disclosure contemplates implementing an unconventional security tool using device 110. The security tool certifies that private encryption key 130 and/or public encryption key 135 are valid before encrypting a transaction request and communicating the encrypted transaction request 140 to server 125. The security tool also communicates the certification for private encryption key 130 and/or public encryption key 135 to server 125. Server 125 may then be assured that public encryption key 135 is valid before using public encryption key 135 to decrypt any received encrypted transaction request 140. In this manner, the desynchronization period is reduced and/or eliminated. The security tool will be described in more detail using FIGS. 2 through 5.

Figure 2:
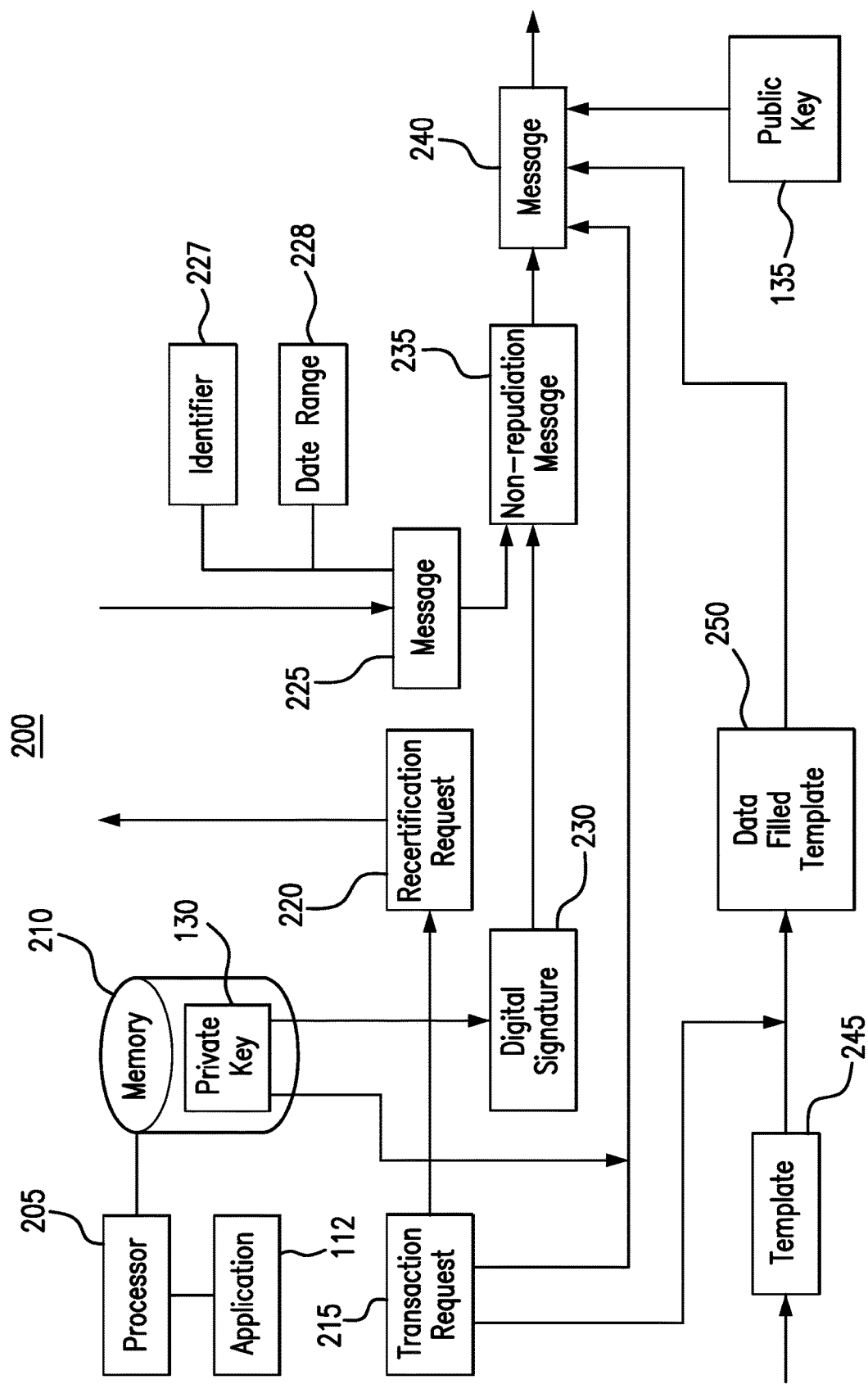
FIG. 2 illustrates an example security tool.

FIG. 2 illustrates an example security tool 200. As seen in FIG. 2, security tool 200 includes a processor 205 and a memory 210. This disclosure contemplates processor 205 and memory 210 being configured to perform any of the functions of security tool 200 described herein. Generally, security tool 200 certifies that an encryption key is valid before encrypting transaction requests using that encryption key. Security tool 200 also communicates any certification for the encryption key along with an encrypted transaction request to a server so that the server can be assured that the encryption key is valid before decrypting the encrypted transaction request. In this manner, the security of the transaction is improved by reducing and/or eliminating the impacts of desynchronization in certain embodiments.

This disclosure contemplates security tool 200 being implemented in one or more devices 110 of system 100. Processor 205 and memory 210 may be components of devices 110. Security tool 200 may be implemented by installing and/or executing application 112 on device 110. When processor 205 executes application 112, device 110 becomes security tool 200 and/or may perform any of the functions of security tool 200 described herein. Thus, security tool 200 is part of device 110 and system 100. Although certain components of system 100 are not illustrated in FIG. 2 for clarity, their absence should not be interpreted as their removal from system 100.

Processor 205 is any electronic circuitry, including, but not limited to microprocessors, application specific integrated circuits (ASIC), application specific instruction set processor (ASIP), and/or state machines, that communicatively couples to memory 210 and controls the operation of security tool 200. Processor 205 may be 8-bit, 16-bit, 32-bit, 64-bit or of any other suitable architecture. Processor 205 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 205 may include other hardware and software that operates to control and process information. Processor 205 executes software stored on memory to perform any of the functions described herein. Processor 205 controls the operation and administration of security tool 200 by processing information received from devices 110, network 115, and memory 210. Processor 205 may be a programmable logic device, a microcontroller, a microprocessor, any suitable processing device, or any suitable combination of the preceding. Processor 205 is not limited to a single processing device and may encompass multiple processing devices.

Memory 210 may store, either permanently or temporarily, data, operational software, or other information for processor 205. Memory 210 may include any one or a combination of volatile or non-volatile local or remote devices suitable for storing information. For example, memory 210 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 210, a disk, a CD, or a flash drive. In particular embodiments, the software may include an application executable by processor 205 to perform one or more of the functions described herein.

Security tool 200 stores private encryption key 130 in memory 210. Private encryption key 130 may be issued by a certificate authority 120. Security tool 200 uses private encryption key 130 to encrypt various messages and/or signals generated by security tool 200. The encrypted signals and/or messages may be decrypted using public encryption key 135 on a server 125.

Security tool 200 intercepts a transaction request 215 from a user when the user requests a transaction. Transaction request 215 may request that a particular transaction be performed by a server. For example, transaction request 215 may request a certain purchase, balance transfer, withdrawal, deposit, login, logout, return, refund, etc. This disclosure contemplates transaction request 215 requesting any suitable transaction to be performed by a server.

Security tool 200 generates and communicates a recertification request 220 in response to receiving transaction request 215. Recertification request 220 requests that a certificate authority recertify and/or validate private encryption key 130 and/or public encryption key 135. Security tool 200 communicates recertification request 220 to a certificate authority.

Security tool 200 receives a message 225 from the certificate authority. Message 225 indicates whether private encryption key 130 and/or public encryption key 135 are valid or invalid. In the example of FIG. 2, message 225 indicates that private encryption key 130 and public encryption key 135 are valid. In response to receiving message 225, security tool 200 begins preparing transaction request 215 for communication to a server.

In certain embodiments, message 225 includes certain components that indicate the validity of private encryption key 130 and/or public encryption key 135. For example, message 225 includes an identifier 227 that identifies private encryption key 130 and/or public encryption key 135. Identifier 227 may be a string of characters that uniquely identifies private encryption key 130 and/or public encryption key 135. Additionally, message 225 may include a date range 228 that indicates a time period in which private encryption key 130 and public encryption key 135 are valid. If security tool 200 determines that the current time falls within date range 228, security tool 200 may determine that private encryption key 130 and/or public encryption 135 are valid. Otherwise, security tool 200 may determine that private encryption key 130 and/or public encryption key 135 are invalid.

Security tool 200 uses private encryption key 130 to generate a digital signature 230. If message 225 indicates that private encryption key 130 is valid, digital signature 230 is used to identify a particular user linked to private encryption key 130. Digital signature 230 is combined with other messages and/or signals to protect and to indicate the integrity of those messages and/or signals. For example, digital signature 230 may be an encrypted file and/or string of characters that uniquely identifies the sender of the message. Digital signature 230 may confirm the identity of the user to a server.

Security tool 200 generates a non-repudiation message 235 using message 225 and digital signature 230. Non-repudiation message 235 confirms to a server that private encryption key 130 and/or public encryption key 135 are valid. Additionally, non-repudiation message 235 confirms the identity of the sender of an encrypted transaction request using digital signature 230. Security tool 200 combines non-repudiation message 235 with other messages and/or signals to communicate to the server.

Security tool 200 generates a message 240 by combining non-repudiation message 235 and transaction request 215. Security tool 200 may encrypt transaction request 215 using private encryption key 130 before combining transaction request 215 with non-repudiation message 235. By encrypting transaction request 215, security tool 200 generates an encrypted transaction request. As a result, message 240 includes an encrypted transaction request and non-repudiation message 235. Security tool 200 communicates message 240 to a server. When the server receives message 240, the server may decrypt components of message 240 using public encryption key 135. For example, the server may decrypt the encrypted transaction request, the non-repudiation message 235, and/or the digital signature 230 using public encryption key 135. The server may then validate the private encryption key 130 and/or public encryption key 135. The server may also confirm the identity of the sender using digital signature 230. Additionally, the server may process transaction request 215. In this manner, the impact of desynchronization is avoided because private encryption key 130 and/or public encryption key 135 are validated by security tool 200 before communicating a transaction request 215 to a server. The server is also assured that the keys are valid before processing the requested transaction. Additionally, the privacy of the user is not compromised because, from the perspective of the certificate authority, the user device is merely requesting recertification of encryption keys, which does not reveal that the user is attempting to make a transaction.

In certain embodiments, security tool 200 receives a template 245 from the server. Template 245 indicates the types of data that should be included with a particular transaction request 215. For example, template 245 may indicate that certain data fields such as balance, user ID, date, etc. should be included with a particular transaction request 215. This disclosure contemplates template 245 indicating that any suitable data should be included with transaction request 215. For example, template 245 may indicate that data such as an order name, order account, ordering amount, ordering currency, beneficiary name, beneficiary account, beneficiary amount, beneficiary currency, and/or transaction date/time should be included with transaction request 215.

Security tool 200 retrieves the data indicated by template 245 from transaction request 215 to form a data filled template 250. The data filled template 250 includes the requested data from transaction request 215. Security tool 200 combines data filled template 250 with non-repudiation message 235 and transaction request 215 in message 240. By communicating data filled template 250 to the server, security tool 200 provides the data that the server may need to perform the transaction requested by transaction request 215.

In some embodiments, the server uses public encryption key 135 to validate digital signature 230. For example, the server may use public encryption key 135 to decrypt digital signature 230. Then, the server may use public encryption key 135 to validate whether the private encryption key 130 used to generate digital signature 230 is valid. As another example, security tool 200 may use public encryption key 135 to validate the identity of the user linked to digital signature 230.

Figure 3:
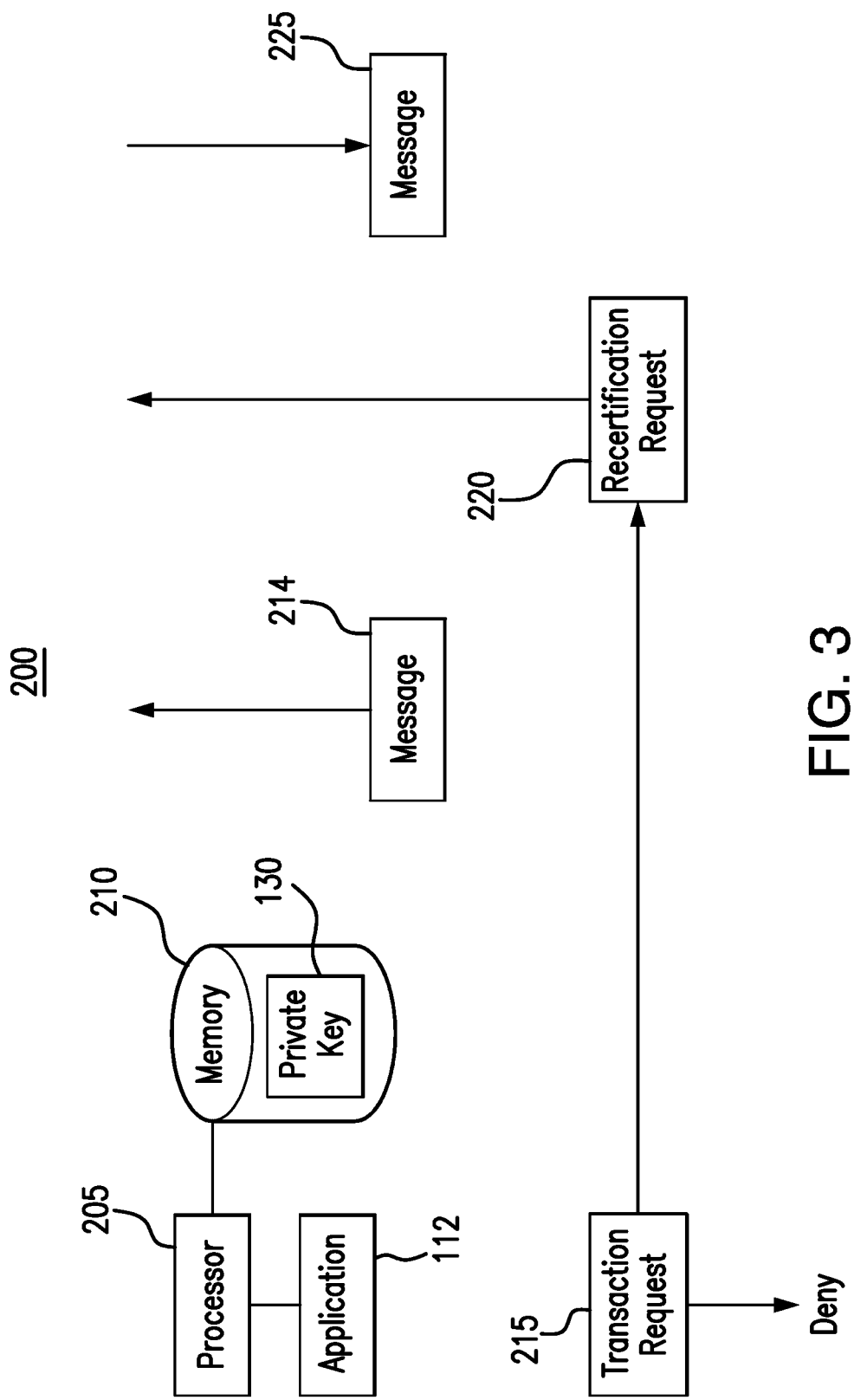
FIG. 3 illustrates an example security tool.

FIG. 3 illustrates the example security tool 200. Generally, the example of FIG. 3 shows security tool 200 denying a transaction request 215 when a certificate authority indicates that private encryption key 130 is invalid.

Security tool 200 communicates a message 214 to the certificate authority. Message 214 may indicate that private encryption key 130 is invalid or should be invalidated. For example, message 214 may indicate that private encryption key 130 has been compromised, such as, for example, by a hacker. In response to receiving message 214, the certificate authority may invalidate private encryption key 130 and/or a public encryption key 135 linked to private encryption key 130. When the certificate authority is subsequently queried, the certificate authority may indicate that private encryption key 130 is invalid. In some embodiments, the certificate authority may issue a new private encryption key and/or public encryption key to security tool 200 after invalidating private encryption key 130.

Security tool 200 intercepts transaction request 215 after sending message 214. Security tool 200 generates and communicates recertification request 220 for private encryption key 130 in response to intercepting transaction request 215. Security tool 200 communicates recertification request 220 to the certificate authority. The certificate authority responds to recertification request 220 by indicating that private encryption key 130 is invalid.

Security tool 200 receives message 225 from the certificate authority. Message 225 indicates that private encryption key 130 is no longer valid. In response to receiving message 225, security tool 200 denies transaction request 215. Security tool 200 may indicate to a user who issued transaction request 215 that the user should obtain new encryption keys from the certificate authority before requesting another transaction.

Figure 4:
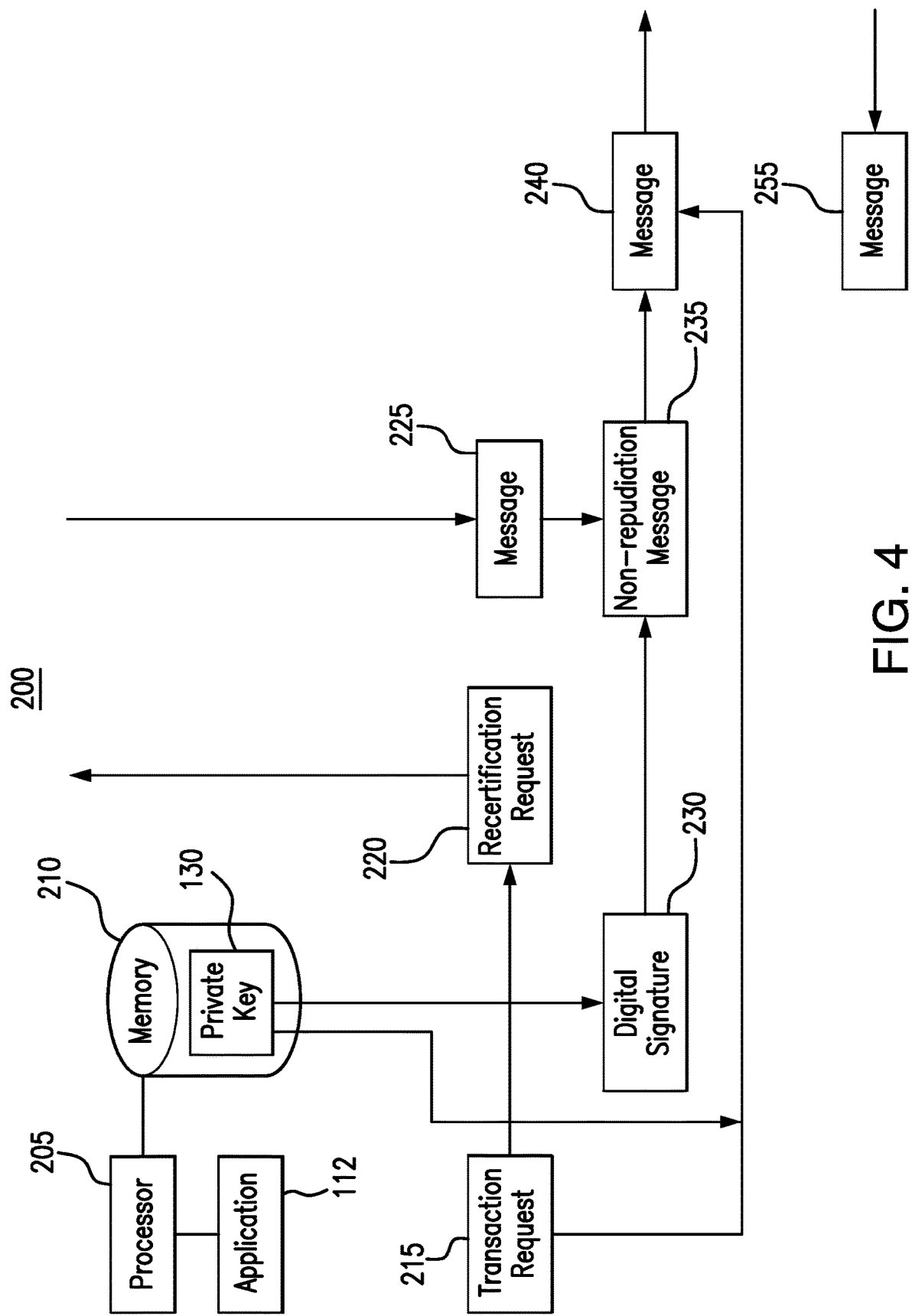
FIG. 4 illustrates an example security tool.

FIG. 4 illustrates the example security tool 200. Generally, in the example of FIG. 4, security tool 200 lets a server determine whether an encryption key is valid or invalid.

Security tool 200 intercepts a transaction request 215. Security tool 200 generates recertification request 220 to determine whether private encryption key 130 is valid. Security tool 200 communicates recertification request 220 to a certificate authority.

In response to receiving recertification request 220, the certificate authority determines whether private encryption key 130 is valid or invalid. The certificate authority communicates message 225 to security tool 200. Message 225 indicates whether private encryption key 130 is valid or invalid.

Security tool 200 generates digital signature 230 using private encryption key 130. Security tool 200 generates non-repudiation message 235 using digital signature 230 and message 225. Security tool 200 then generates message 240 using non-repudiation message 235 and transaction request 215. In some embodiments, security tool 200 encrypts transaction request 215 using private encryption key 130 before using transaction request 215 to generate message 240. Security tool 200 then communicates message 240 to the server.

The server analyzes message 240 to determine whether private encryption key 130 and/or a corresponding public encryption key are valid or invalid. The server generates and communicates message 255 to security tool 200. Message 255 indicates whether private encryption key 130 is valid or invalid. If private encryption key 130 is valid, the server may also process the transaction requested by transaction request 215. In this manner, the task of recertifying private encryption key 130 is performed by security tool 200, but the server is tasked with determining whether the certificate authority validated the encryption keys or not.

Figure 5:
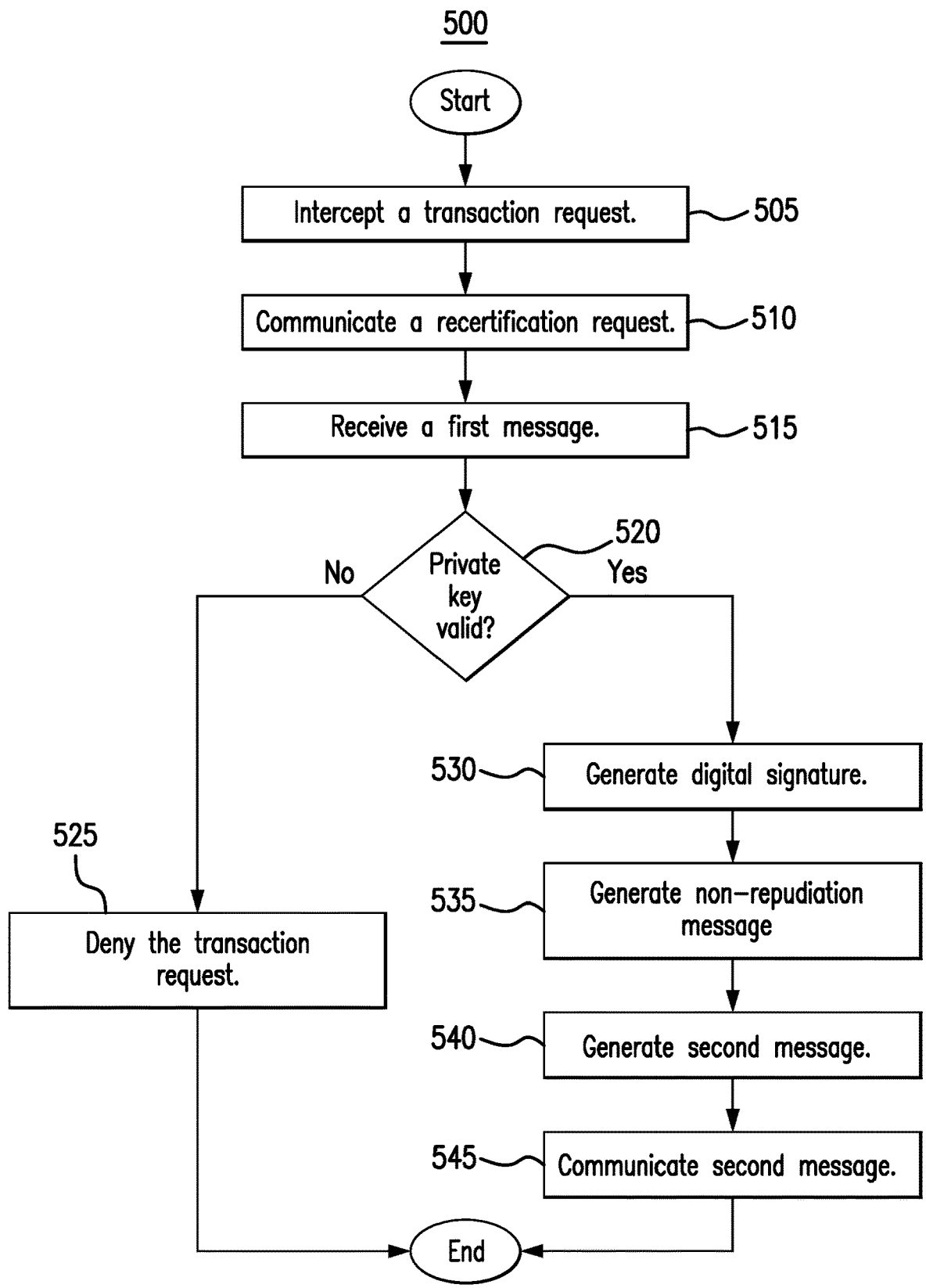
FIG. 5 is a flowchart illustrating a method for improving security.

FIG. 5 is a flow chart illustrating a method 500 for improving security. Generally, various components of system 100 and/or security tool 200 performed the steps of method 500. In certain embodiments method 500 improves the security of a transaction by validating whether encryption keys are valid before requesting the transaction. Additionally, the privacy of a user is not compromised because, from the perspective of the certificate authority, the user is merely requesting recertification of keys, which does not reveal that the user is attempting a transaction.

Security tool 200 begins by intercepting a transaction request in step 505. In step 510, security tool 200 communicates a recertification request. The recertification request may be communicated to a certificate authority. Security tool 200 receives a first message in step 515. The first message may be from the certificate authority and may indicate whether a private encryption key is valid or invalid.

In step 520, security tool 200 determines whether a private encryption key is valid or not. Security tool 200 may make this determination based on the first message received in step 515. If the private encryption key is not valid, security tool 200 denies the transaction request in step 525.

If the private encryption key is valid, security tool 200 generates a digital signature in step 530 using the private encryption key. In step 535, security tool 200 generates a non-repudiation message. The non-repudiation message may be formed using the digital signature and the received first message. In step 540, security tool 200 generates a second message. The second message may be formed using the non-repudiation message and the transaction request. Security tool 200 communicates the second message to a server in step 545.

Modifications, additions, or omissions may be made to method 500 depicted in FIG. 5. Method 500 may include more, fewer, or other steps. For example, steps may be performed in parallel or in any suitable order. While discussed as security tool 200 performing the steps, any suitable component of system 100, such as device(s) 110 and/or server 125 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store a private encryption key and a public encryption key; and
a hardware processor programmed to execute a security tool to:
  perform a recertification operation comprising:
    intercepting a first transaction request from a user, wherein the first transaction request comprises a request to login to an account associated with the user and wherein the first transaction is received by the apparatus from the user;
    communicating a first recertification request to a certificate authority that issued the private encryption key and the public encryption key, wherein the first recertification request is different from a first certification request and wherein the first transaction request is excluded from the first recertification request, such that even after communicating the first recertification request to the certificate authority, the certificate authority remains unaware of a user's intent about making a transaction;
    receiving, from the certificate authority, a first message indicating that the private encryption key and the public encryption key are valid for use, wherein the first message comprises a date range associated with the private encryption key and the public encryption key; and
    in response to receiving the first message, determining current time and determining that the current time falls within the date range;
  receive, from a server, a template indicating data fields that should be included from the first transaction request, wherein the data fields comprise an account balance associated with the user; and
  in response to performing the recertification operation:
    generate a first digital signature using the private encryption key;
    generate a first non-repudiation message comprising the first digital signature and the first message;
    generate a data-filled template by retrieving the data fields from the first transaction request and filling in the data fields of the template;
    generate a second message comprising the first transaction request, the data-fined template, and the first non-repudiation message; and
    communicate the second message to the server to process the first transaction request, wherein the recertification operation is performed prior to each transaction with the server.

2. The apparatus of claim 1, wherein the hardware processor is further configured to:
communicate a third message to the certificate authority that the private encryption key has been compromised;
intercept a second transaction request from the user;
communicate a second recertification request to the certificate authority;
receive, from the certificate authority, a fourth message indicating that the private encryption key and the public encryption key are not valid for use; and
in response to the fourth message:
  deny the second transaction request; and
  indicate to the user to obtain a new private encryption key and a new public encryption key before requesting another transaction.

3. The apparatus of claim 1, wherein the hardware processor is further configured to:
intercept a second transaction request from the user;
communicate a second recertification request to the certificate authority;
receive, from the certificate authority, a third message;
generate a second digital signature using the private encryption key;
generate a second non-repudiation message comprising the second digital signature and the third message;
generate a fourth message comprising the second transaction request and the second non-repudiation message;
communicate the fourth message to the server, wherein the server parses the second non-repudiation message to determine whether the private encryption key is valid for use; and
receive a fifth message from the server indicating whether the private encryption key is valid for use and whether the second transaction request is denied.

4. The apparatus of claim 1, wherein the first digital signature is validated using the user's public encryption key stored in a database.

5. The apparatus of claim 1, wherein the hardware processor is further configured to encrypt the first transaction request using the private encryption key.

6. The apparatus of claim 1, wherein the first message comprises an identifier of the certificate authority.

7. A method comprising:
storing, by a memory, a private encryption key and a public encryption key;
performing, by a hardware processor communicatively coupled to the memory and executing a security tool, a recertification operation comprising:
intercepting a first transaction request from a user, wherein the first transaction request comprises a request to login to an account associated with the user and wherein the first transaction is received by an apparatus that comprises the memory and the hardware processor;
communicating a first recertification request to a certificate authority that issued the private encryption key and the public encryption key, wherein the first recertification request is different from a first certification request and wherein the first transaction request is excluded from the first recertification request, such that even after communicating the first recertification request to the certificate authority, the certificate authority remains unaware of a user's intent about making a transaction;
receiving from the certificate authority, a first message indicating that the private encryption key and the public encryption key are valid for use, wherein the first message comprises a date range associated with the private encryption key and the public encryption key; and
in response to receiving the first message, determining current time and determining that the current time falls within the date range;
receiving, by the processor executing the security tool, from a server, a template indicating data fields that should be included from the first transaction request, wherein the data fields comprise an account balance associated with the user; and
in response to performing the recertification operation:
generating, by the processor executing the security tool, a first digital signature using the private encryption key;
generating, by the processor executing the security tool, a first non-repudiation message comprising the first digital signature and the first message;
generating, by the processor executing the security tool, a data-filled template by retrieving the data fields from the first transaction request and filling in the data fields of the template;
generating, by the processor executing the security tool, a second message comprising the first transaction request, the data-filled template, and the first non-repudiation message; and
communicating, by the processor executing the security tool, the second message to the server to process the first transaction request, wherein the recertification operation is performed prior to each transaction with the server.

8. The method of claim 7, further comprising:
communicating, by the processor, a third message to the certificate authority that the private encryption key has been compromised;
intercepting, by the processor, a second transaction request from the user;
communicating, by the processor, a second recertification request to the certificate authority;
receiving, by the processor, from the certificate authority, a fourth message indicating that the private encryption key and the public encryption key are not valid for use; and
in response to the fourth message:
denying, by the processor, the second transaction request; and
indicating to the user to obtain a new private encryption key and a new public encryption key before requesting another transaction.

9. The method of claim 7, further comprising:
intercepting, by the processor, a second transaction request from the user;
communicating, by the processor, a second recertification request to the certificate authority;
receiving, by the processor, from the certificate authority, a third message;
generating, by the processor, a second digital signature using the private encryption key;
generating, by the processor, a second non-repudiation message comprising the second digital signature and the third message;
generating, by the processor, a fourth message comprising the second transaction request and the second non-repudiation message;
communicating, by the processor, the fourth message to the server, wherein the server parses the second non-repudiation message to determine whether the private encryption key is valid for use; and
receiving, by the processor, a fifth message from the server indicating whether the private encryption key is valid for use and whether the second transaction request is denied.

10. The method of claim 7, wherein the first digital signature is validated using the user's public encryption key stored in a database.

11. The method of claim 7, further comprising encrypting, by the processor, the first transaction request using the private encryption key.

12. The method of claim 7, wherein the first message comprises an identifier of the certificate authority.

13. A system comprising:
a certificate authority;
a server; and
an apparatus comprising a security tool programmed to:
store a private encryption key and a public encryption key from the certificate authority;
perform a recertification operation comprising:
intercepting a first transaction request from a user wherein the first transaction request comprises a request to login to an account associated with the user and wherein the first transaction is received by the apparatus from the user;
communicating a first recertification request to the certificate authority that issued the private encryption key and the public encryption key, wherein the first recertification request is different from a first certification request and wherein the first transaction request is excluded from the first recertification request, such that even after communicating the first recertification request to the certificate authority, the certificate authority remains unaware of a user's intent about making a transaction;

receiving, from the certificate authority, a first message indicating that the private encryption key and the public encryption key are valid for use, wherein the first message comprises a date range associated with the private encryption key and the public encryption key; and in response to receiving the first message, determining current time and determining that the current time falls within the date range;

receive, from the server, a template indicating data fields that should be included from the first transaction request, wherein the data fields comprise an account balance associated with the user; and in response to performing the recertification operation:
generate a first digital signature using the private encryption key;
generate a first non-repudiation message comprising the first digital signature and the first message;
generate a data-filled template by retrieving the data fields from the first transaction request and filling in the data fields of the template;
generate a second message comprising the first transaction request, the data-filled template, and the first non-repudiation message; and
communicate the second message to the server to process the first transaction request, wherein the recertification operation is performed prior to each transaction with the server.

14. The system of claim 13, wherein the security tool is further configured to:
communicate a third message to the certificate authority that the private encryption key has been compromised;
intercept a second transaction request from the user;
communicate a second recertification request to the certificate authority;
receive, from the certificate authority, a fourth message indicating that the private encryption key and the public encryption key are not valid for use; and
in response to the fourth message:
deny the second transaction request; and
indicate to the user to obtain a new private encryption key and a new public encryption key before requesting another transaction.

15. The system of claim 13, wherein the security tool is further configured to:
intercept a second transaction request from the user;
communicate a second recertification request to the certificate authority;
receive, from the certificate authority, a third message;
generate a second digital signature using the private encryption key;
generate a second non-repudiation message comprising the second digital signature and the third message;
generate a fourth message comprising the second transaction request and the second non-repudiation message;
communicate the fourth message to the server, wherein the server parses the second non-repudiation message to determine whether the private encryption key is valid for use; and
receive a fifth message from the server indicating whether the private encryption key is valid for use and whether the second transaction request is denied.

16. The system of claim 13, wherein the first digital signature is validated using the user's public encryption key stored in a database.

17. The system of claim 13, wherein the security tool is further configured to encrypt the first transaction request using the private encryption key.

* * * * *